United States Patent Office 3,350,461
Patented Oct. 31, 1967

3,350,461
PROCESS FOR THE PRODUCTION OF POLY-
OXYPROPYLENE DIOLS
Harry H. Fall, Akron, Ohio, assignor to The General
Tire & Rubber Company, a corporation of Ohio
No Drawing. Filed Oct. 10, 1963, Ser. No. 315,407
2 Claims. (Cl. 260—615)

This invention relates to a process for the production of polypropylene oxide glycols. More particularly, this invention relates to a process for the production of allyl glycidyl ether-propylene oxide copolymeric diols having molecular weights in the range of from 2500 to about 700 and having little or not terminal unsaturation.

Heretofore it has been shown that propylene oxide can be polymerized under basic conditions when an organic compound containing an active hydrogen, e.g. alcohols, phenols, amines and the like, is employed as an intiator to yield polypropylene oxide polymers containing hydroxyl end groups and wherein molecular weights of such polymers were up to about 2500. In instances where it was attempted to produce polypropylene oxide polymers having molecular weights from about 2500 to about 7000, secondary reactions took place and large amounts of polymer molecules containing terminally unsaturated groups were formed necessitating further treatment of such polymers to convert the terminally unsaturated groups to hydroxyl groups.

It is also known that propylene oxide can be polymerized in a heterogeneous system by stirring liquid propylene oxide over finely divided solid potassium hydroxide at about 33° C. for approximately 40 hours. The propylene oxide polymers thus produced have molecular weights in the range of from about 1000 to about 5000. It has been found that this method produces propylene oxide polymers wherein approximately 80% of the molecules contain terminal unsaturation and thus are not suitable for the production of linear polyurethane.

It is an object of this invention to produce polyoxypropylene-allyl glycidyl ether copolymers having terminal hydroxyl groups and having molecular weights in the range from about 2000 to about 7000 wherein substantially less than 5% of the molecules contain terminal unsaturation. These and other objects are accomplished by employing the processes of this invention as hereinafter set forth.

According to the process of this invention, polyoxypropylene diols can be prepared by the polymerization of propylene oxide and allyl glycidyl ether in a heterogeneous system employing finely divided solid potassium hydroxide as the catalyst. The potassium hydroxide should have a purity of at least 85% and preferably should have a purity of at least 90%.

It has been found that unless allyl glycidyl ether is employed as an initiator in this copolymerization, the amount of terminal unsaturation in the molecules is not decreased but is within the range produced by the processes heretofore known in the art. The amount of allyl glycidyl ether employed in the process of the present invention can range from about 0.15 mole to about 4.3 moles for each 4.3 moles of propylene oxide. When amounts of the allyl glycidyl ether below .15 for each 4.3 moles of propylene oxide are employed, terminal unsaturation results.

It has also been found that the amount and the form of the potassium hydroxide employed in the process of this invention has an effect on the product produced. Potassium hydroxide should be employed in a finely powdered state and should have a purity of at least 85% as herein above set forth in order to obtain polymers having decreased amounts of terminal unsaturation. The amount of potassium hydroxide employed can be from about 1.5 weight percent of potassium hydroxide to about 7.3 weight percent of potassium hydroxide based on the total weight of propylene oxide and allyl glycidyl ether employed.

The process of the present invention is preferably conducted at room temperature, i.e. from about 15° C. to about 30° C. The reaction being exothermic, the temperature will rise to about 100° C. for a short time during the polymerization. Although higher or lower starting temperatures can be employed, no commensurate advantages are obtained thereby.

According to the process of this invention, propylene oxide, allyl glycidyl ether, and solid powdered potassium hydroxide are charged into a glass reaction vessel forming a heterogeneous mixture while being maintained at ambient temperatures with stirring, whereby the propylene oxide and allyl glycidyl ether copolymerize through the epoxide groups under the influence of the potassium hydroxide to produce the essentially linear hydroxy terminated polyoxypropylene-allyl glycidyl ether copolymers.

The process of the invention is preferably conducted at atmospheric pressure. Although higher or lower pressures can be employed, no commensurate advantages are obtained thereby.

The polyoxypropylene-allyl glycidyl ether copolymers produced according to the process of this invention are useful as lubricants. These copolymers are also useful in the production of polyurethane elastomers by chain extending these diols with a diisocyanate, for example, toluene diisocyanate. Such polyurethane rubbers can be cured employing a sulfur curing system.

The following examples serve to further illustrate the invention and are not to be construed as limitations thereof.

*Example 1*

Into a glass reaction vessel fitted with a stirrer and water-cooled reflux condenser were charged propylene oxide (250 g., 4.3 moles), allyl glycidyl ether (22.8 g., 0.2 mole) and powdered potassium hydroxide (16.7 g., 0.27 mole, 90% by weight KOH). The contents of the vessel were stirred at room temperature for 28 hours. There was obtained 255 g. of a polymeric product having 0.788 millimole of unsaturation per gram of polymer and a hydroxyl number of 20.4. The amount of unsaturation found in the polymeric product is approximately equal to the amount of unsaturation introduced into the reaction as the allyl group of the allyl glycidyl ether.

Another polymeric product obtained in the same manner as above had 0.801 millimole of unsaturation per gram of polymer and a hydroxyl number of 21.6. The molecular weight of the product calculated from the hydroxyl number was 5190. Determined by the isopiestic method the molecular weight was found to be, on an average, 4880 which substantiates that the polymer obtained is a copolymer of allyl glycidyl ether and propylene oxide having terminal hydroxyl groups, i.e., that it is a polyoxyalkylene glycol.

Example 2

A series of experiments was conducted employing the procedure as described in Example 1 wherein the amount of the powdered 90% potassium hydroxide catalyst was varied. The amounts of the monomer, i.e., allyl glycidyl ether and propylene oxide were the same as employed in Example 1. It was found that as the amount of potassium hydroxide catalyst was decreased, there was a corresponding decrease in the yield of the copolymer produced (Table I). It was found that the amount of unsaturation present in the polymers isolated corresponded within the limits of experimental error to the amount of the allyl glycidyl ether introduced into the system and, consequently, the polymers had terminal hydroxyl groups.

with the yield, hydroxyl number, unsaturation content, and molecular weights of the copolymeric fluids obtained. It can be seen by an examination of the data set forth in Table II that the amount of allyl glycidyl ether employed greatly affects the amount of the unsaturation in the copolymeric product.

TABLE II

| Run No. | Age moles | Temp., °C. | Time, hrs. | Yield | | Unsaturation Content | | | Mol. Weight |
|---|---|---|---|---|---|---|---|---|---|
| | | | | Grams | Percent | Hydroxyl number | Moles/gram found | Moles/gram calc. | |
| H | 0.4 | 78.5 | 25 | 247 | 93.5 | 21.32 | 1.435 | 1.444 | 5,260 |
| J | 0.2 | 94.0 | 27 | 254 | 93.1 | 25.04 | 0.738 | 0.789 | 4,480 |
| G | 0.1 | 49.0 | 52 | 245 | 93.8 | 20.32 | 0.485 | 0.408 | 4,560 |
| K | 0.125 | 66.0 | 48 | 250 | 93.6 | 23.48 | 0.547 | 0.500 | 4,290 |
| L | 0.150 | 58.5 | 48 | 254 | 95.2 | 21.47 | 0.657 | 0.591 | 4,450 |
| M | 0.175 | 76.5 | 48 | 251 | 93.0 | 29.65 | 0.591 | 0.696 | 3,780 |

TABLE I

| Run No. | 90% KOH (g.) | Yield | |
|---|---|---|---|
| | | Grams | Percent |
| C | 4.2 | 17 | 6.2 |
| D | 8.4 | 149 | 54.6 |
| E | 10.5 | 185 | 67.7 |
| F | 12.6 | 234 | 85.7 |
| A | 16.7 | 257 | 94.2 |

Example 3

A series of experiments was conducted to determine the effect of variation of the molar ratio of allyl glycidyl ether to propylene oxide in the polymerization. The polymerization was carried out in a heterogeneous system as set forth in the procedure of Example 1. Table II summarizes the time of the reaction and the maximum exothermic temperature incurred during the reaction together

What is claimed is:

1. A process for the production of allyl glycidyl ether-propylene oxide copolymeric diols having a molecular weight from about 2000 to about 7000 which comprises forming an admixture of propylene oxide and allyl glycidyl ether said admixture containing from about 0.035 mole to about 1.0 mole of allyl glycidyl ether for each mole of propylene oxide adding from about 1.5% to about 7.3% by weight of said admixture of finely divided potassium hydroxide having a purity of at least 85 percent by weight and maintaining said mixture at a temperature at which said propylene oxide and said allyl glycidyl ether react under the influence of said potassium hydroxide to produce said copolymeric diols.

2. The process as claimed in claim 1 wherein the potassium hydroxide has a purity of at least 90%.

References Cited

UNITED STATES PATENTS

| | | | |
|---|---|---|---|
| 2,510,540 | 6/1950 | Ballard et al. | 260—615 |
| 2,522,155 | 9/1950 | Ballard et al. | 260—615 |
| 3,135,705 | 6/1964 | Vandenberg | 260—615 XR |
| 3,135,706 | 6/1964 | Vandenberg | 260—615 XR |

OTHER REFERENCES

Bailey et al.: J. Polymer. Sci., vol. 45, pp. 243–6 (1960).

Pierre et al.: "Jour. Amer. Chem. Soc.," vol. 78, pp. 3432–36 (1956).

LEON ZITVER, *Primary Examiner.*

H. T. MARS, *Assistant Examiner.*